(12) United States Patent
Levitsky et al.

(10) Patent No.: US 11,652,591 B2
(45) Date of Patent: May 16, 2023

(54) DYNAMIC JOINT INDICATIONS OF A DEMODULATION REFERENCE SIGNAL CONFIGURATION AND A PHYSICAL UPLINK CHANNEL TRANSMISSION MODE

(71) Applicant: QUALCOMM Incorporated, San Diego, CA (US)

(72) Inventors: Michael Levitsky, Rehovot (IL); Ran Berliner, Kfar-Aviv (IL); Gokul Sridharan, Sunnyvale, CA (US); Hung Dinh Ly, San Diego, CA (US); Alexander Sverdlov, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/450,641

(22) Filed: Oct. 12, 2021

(65) Prior Publication Data

US 2022/0123889 A1 Apr. 21, 2022

Related U.S. Application Data

(60) Provisional application No. 63/092,772, filed on Oct. 16, 2020.

(51) Int. Cl.
*H04L 5/00* (2006.01)
*H04W 72/23* (2023.01)

(52) U.S. Cl.
CPC .......... *H04L 5/0048* (2013.01); *H04W 72/23* (2023.01)

(58) Field of Classification Search
CPC .................... H04L 5/0048; H04W 72/042
See application file for complete search history.

(56) References Cited

U.S. PATENT DOCUMENTS

2020/0137745 A1* 4/2020 Bacuh .................. H04L 5/0091

* cited by examiner

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a base station may determine a demodulation reference signal (DMRS) configuration and a physical uplink shared channel (PUSCH) transmission mode for a user equipment to use for one or more uplink transmissions. The base station may transmit a dynamic joint indication of the DMRS configuration and the PUSCH transmission mode. Numerous other aspects are provided.

28 Claims, 9 Drawing Sheets

500 →

| DMRS Parameter 1 | DMRS Parameter 2 | DMRS Parameter 3 | DMRS Parameter 4 | TB Repetition Parameter | DMRS Bundling Parameter | Frequency Hopping Parameter 1 | Frequency Hopping Parameter 2 |
|---|---|---|---|---|---|---|---|
| A | B | C | D | E | F | G | H |
| A' | B | C | D | E | F | G | H |
| A | B' | C' | D | E | F | G | H |
| A | B | C | D | E | F | G | H |
| A' | B | C | D | E | F | G | H |
| ... | | | | | | | |
| A'' | B'''' | C' | D' | E' | F' | G' | H' |

510 →

| DMRS Parameter 1 | DMRS Parameter 2 | DMRS Parameter 3 | DMRS Parameter 4 | TB Repetition Parameter | DMRS Bundling Parameter | Frequency Hopping Parameter 1 | Frequency Hopping Parameter 2 |
|---|---|---|---|---|---|---|---|
| A'' | B'''' | C | D' | E | F | G | H' |
| A | B | C | D | E'' | F' | G' | H' |
| A' | B' | C' | D' | E' | F' | G' | H' |
| A'' | B'''' | C' | D' | E''' | F' | G' | H' |

520 →

| DMRS Parameter 1 | DMRS Parameter 2 | DMRS Parameter 3 | DMRS Parameter 4 | TB Repetition Parameter | DMRS Bundling Parameter | Frequency Hopping Parameter 1 | Frequency Hopping Parameter 2 |
|---|---|---|---|---|---|---|---|
| A' | B' | C' | D' | E' | F' | G' | H' |

FIG. 5

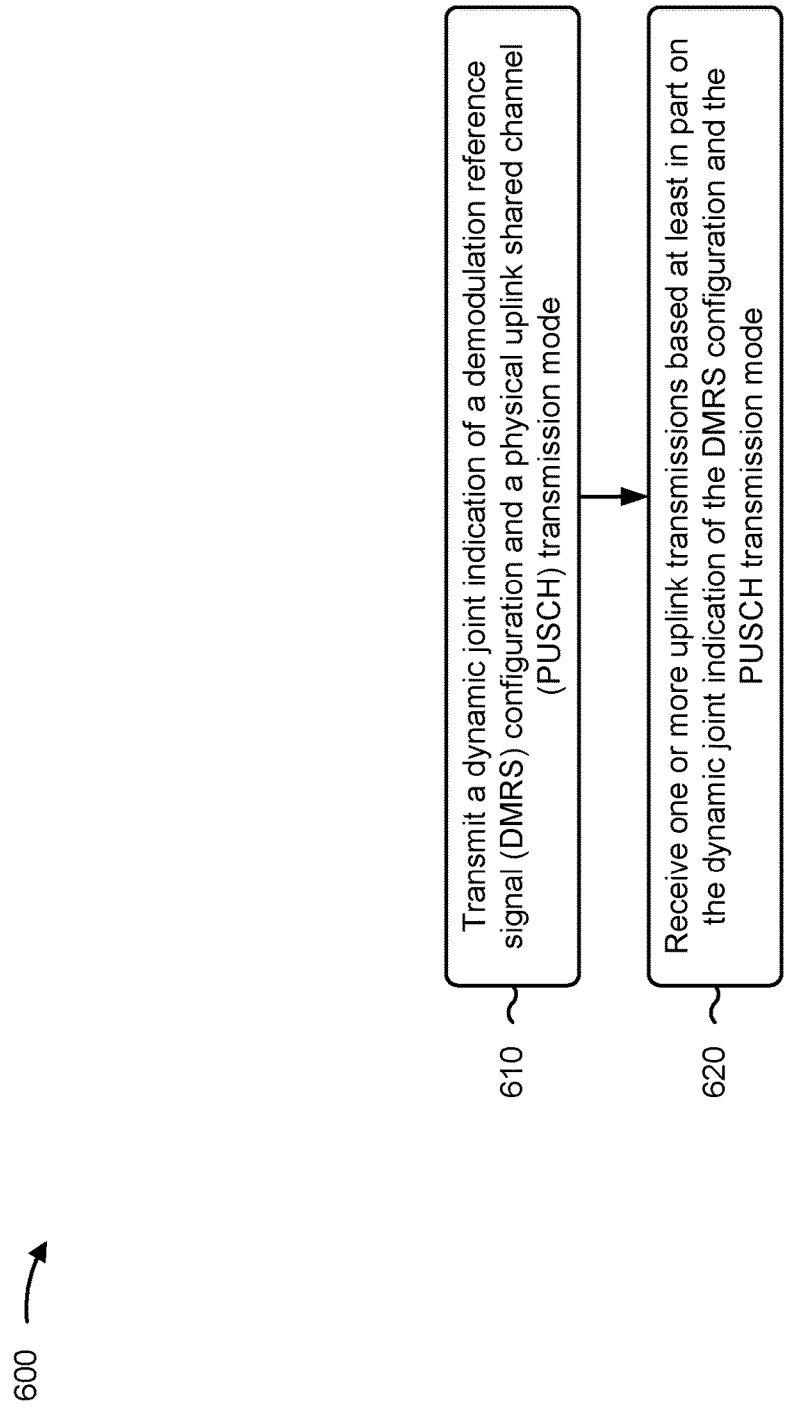

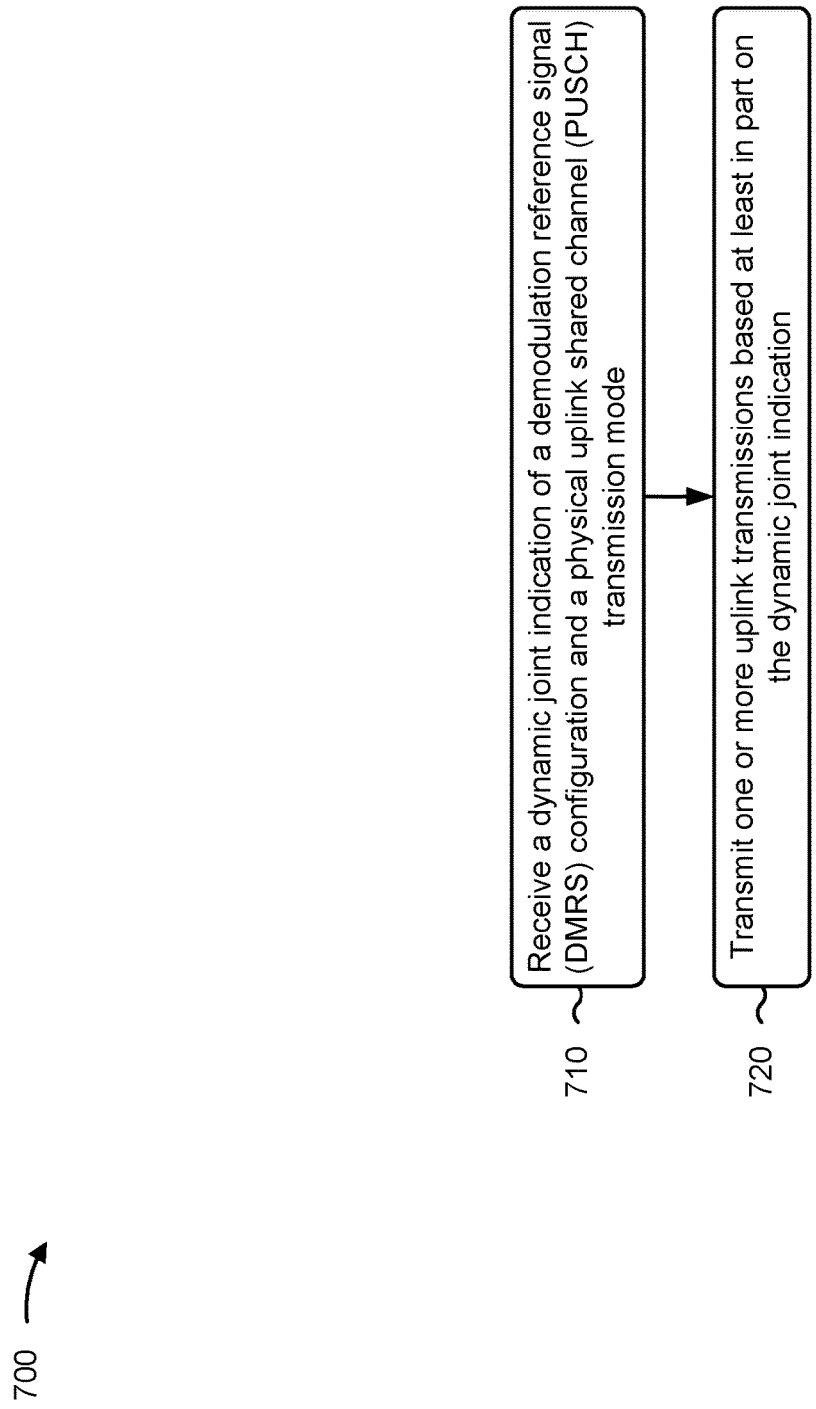

DYNAMIC JOINT INDICATIONS OF A DEMODULATION REFERENCE SIGNAL CONFIGURATION AND A PHYSICAL UPLINK CHANNEL TRANSMISSION MODE

CROSS-REFERENCE TO RELATED APPLICATION

This patent application claims priority to U.S. Provisional Patent Application No. 63/092,772, filed on Oct. 16, 2020, entitled "DYNAMIC JOINT INDICATIONS OF A DEMODULATION REFERENCE SIGNAL CONFIGURATION AND A PHYSICAL UPLINK CHANNEL TRANSMISSION MODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamic joint indications of a demodulation reference signal configuration and a physical uplink channel transmission mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a base station. The method may include transmitting a dynamic joint indication of a demodulation reference signal (DMRS) configuration and a physical uplink shared channel (PUSCH) transmission mode. The method may include receiving one or more uplink transmissions based at least in part on the dynamic joint indication of the DMRS configuration and the PUSCH transmission mode.

Some aspects described herein relate to a method of wireless communication performed by a user equipment. The method may include receiving a dynamic joint indication of a DMRS configuration and a PUSCH transmission mode. The method may include transmitting one or more uplink transmissions based at least in part on the dynamic joint indication.

Some aspects described herein relate to a base station for wireless communication. The base station may include a memory and one or more processors coupled to the memory. The one or more processors may be configured to transmit a dynamic joint indication of a DMRS configuration and a PUSCH transmission mode. The one or more processors may be configured to receive one or more uplink transmissions based at least in part on the dynamic joint indication of the DMRS configuration and the PUSCH transmission mode.

Some aspects described herein relate to a user equipment for wireless communication. The user equipment may include a memory and one or more processors coupled to the memory. The one or more processors may be configured to receive a dynamic joint indication of a DMRS configuration and a PUSCH transmission mode. The one or more processors may be configured to transmit one or more uplink transmissions based at least in part on the dynamic joint indication.

Some aspects described herein relate to a non-transitory computer-readable medium that stores a set of instructions for wireless communication by a base station. The set of instructions, when executed by one or more processors of the base station, may cause the base station to transmit a dynamic joint indication of a DMRS configuration and a PUSCH transmission mode. The set of instructions, when executed by one or more processors of the base station, may cause the base station to receive one or more uplink transmissions based at least in part on the dynamic joint indication of the DMRS configuration and the PUSCH transmission mode.

Some aspects described herein relate to a non-transitory computer-readable medium that stores a set of instructions for wireless communication by a user equipment. The set of instructions, when executed by one or more processors of the user equipment, may cause the user equipment to receive a dynamic joint indication of a DMRS configuration and a PUSCH transmission mode. The set of instructions, when executed by one or more processors of the user equipment, may cause the user equipment to transmit one or more uplink transmissions based at least in part on the dynamic joint indication.

Some aspects described herein relate to an apparatus for wireless communication. The apparatus may include means for transmitting a dynamic joint indication of a DMRS configuration and a PUSCH transmission mode. The apparatus may include means for receiving one or more uplink transmissions based at least in part on the dynamic joint indication of the DMRS configuration and the PUSCH transmission mode, means for receiving one or more uplink transmissions based at least in part on the dynamic joint indication of the DMRS configuration and the PUSCH transmission mode.

Some aspects described herein relate to an apparatus for wireless communication. The apparatus may include means for receiving a dynamic joint indication of a DMRS configuration and a PUSCH transmission mode. The apparatus may include means for transmitting one or more uplink transmissions based at least in part on the dynamic joint indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3-5 are diagrams illustrating examples associated with dynamic joint indications of a demodulation reference signal configuration and a physical uplink channel transmission mode, in accordance with the present disclosure.

FIGS. 6 and 7 are diagrams illustrating example processes associated with dynamic joint indications of a demodulation reference signal configuration and a physical uplink channel transmission mode, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
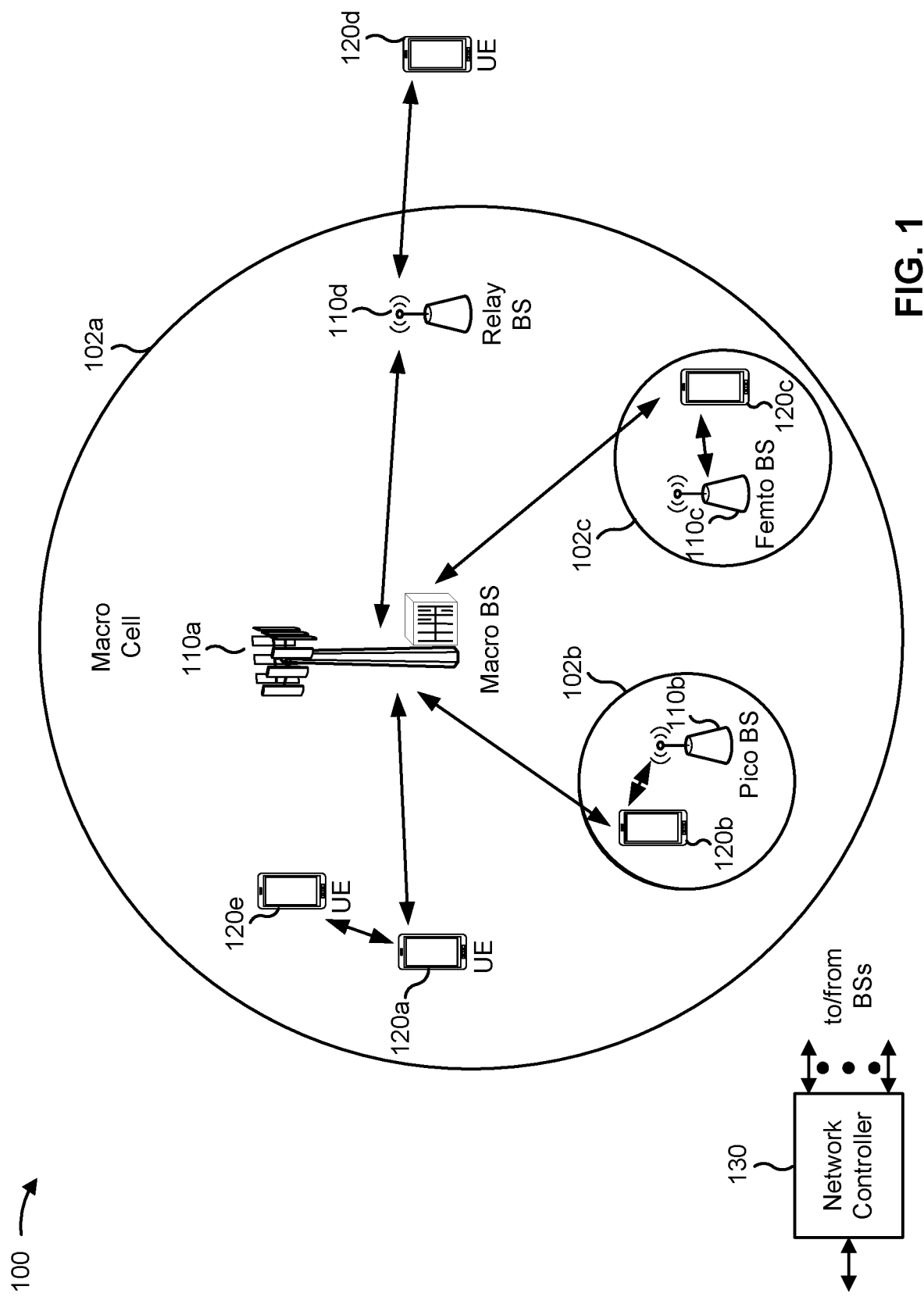
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
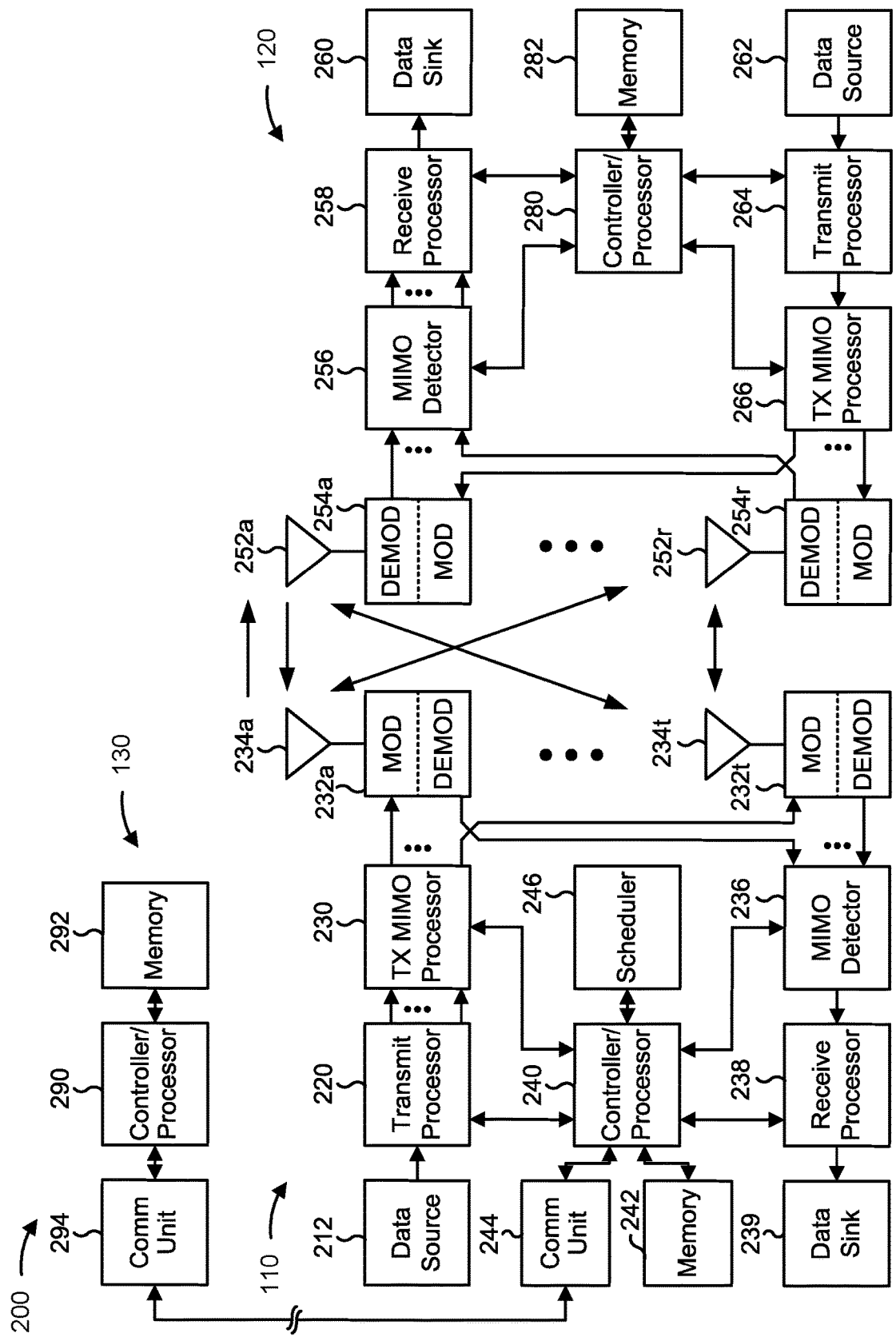
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream.

Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-9).

Controller/processor 240 of base station 110, controller/processor 280 of UE 120, and/or any other component(s) of FIG. 2 may perform one or more techniques associated with dynamic joint indications of a DMRS configuration and a physical uplink channel transmission mode, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the base station includes means for determining a DMRS configuration and a PUSCH transmission mode for a user equipment to use for one or more uplink transmissions; and/or means for transmitting a dynamic joint indication of the DMRS configuration and the PUSCH transmission mode. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for determining the DMRS configuration based at least in part on the PUSCH transmission mode, means for determining the PUSCH transmission mode based at least in part on the DMRS configuration, or means for determining the PUSCH transmission mode and the DMRS configuration jointly.

In some aspects, the base station includes means for transmitting an indication of a subset of candidate joint configurations that each indicate a candidate DMRS configuration and a candidate PUSCH transmission mode and means for transmitting an indication of a selection of a candidate joint configuration of the subset of candidate joint configurations.

In some aspects, the base station includes means for transmitting the indication of the subset of candidate joint configurations that each indicate a candidate DMRS configuration and a candidate PUSCH transmission mode via one or more medium access control (MAC) control elements (MAC CEs).

In some aspects, the base station includes means for transmitting the indication of the selection of the candidate joint configuration of the subset of candidate joint configurations via downlink control information (DCI).

In some aspects, the base station includes means for transmitting an indication of a set of candidate joint configurations that includes the subset of candidate joint configurations.

In some aspects, the base station includes means for transmitting an indication of a number of candidate joint configurations that are to be included in the subset of candidate joint configurations.

In some aspects, the base station includes means for transmitting an indication of a subset of candidate DMRS configurations via one or more MAC CEs, In some aspects, the base station includes means for transmitting an indication of a selection of a candidate joint configuration that indicates a candidate DMRS configuration and a candidate PUSCH transmission mode.

In some aspects, the base station includes means for transmitting the indication of the selection of the candidate joint configuration via one or more MAC CEs.

In some aspects, the user equipment includes means for receiving a dynamic joint indication of a DMRS configuration and a PUSCH transmission mode; and/or means for transmitting one or more uplink transmissions based at least in part on the dynamic joint indication. The means for the user equipment to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the user equipment includes means for receiving an indication of a subset of candidate joint configurations that each indicate a candidate DMRS configuration and a candidate PUSCH transmission mode and means for receiving an indication of a selection of a candidate joint configuration of the subset of candidate joint configurations.

In some aspects, the user equipment includes means for receiving the indication of the subset of candidate joint configurations that each indicate a candidate DMRS configuration and a candidate PUSCH transmission mode via one or more MAC CEs.

In some aspects, the user equipment includes means for receiving the indication of the selection of the candidate joint configuration of the subset of candidate joint configurations via DCI.

In some aspects, the user equipment includes means for receiving an indication of a set of candidate joint configurations that includes the subset of candidate joint configurations.

In some aspects, the user equipment includes means for receiving an indication of a number of candidate joint configurations that are to be included in the subset of candidate joint configurations.

In some aspects, the user equipment includes means for receiving an indication of a subset of candidate DMRS configurations via one or more MAC CEs.

In some aspects, the user equipment includes means for receiving an indication of a selection of a candidate joint configuration that indicates a candidate DMRS configuration and a candidate PUSCH transmission mode.

In some aspects, the user equipment includes means for receiving the indication of the selection of the candidate joint configuration via one or more MAC CEs.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some networks, DMRSs may be transmitted within a message to provide a receiving device (e.g., a base station and/or a UE, among other examples) with one or more reference signals to use for a determination of a channel estimation. The receiving device may estimate a channel to improve accuracy of demodulation and/or decoding of the message. The DMRSs may be configured based at least in part on one or more conditions (e.g., channel conditions) to improve a likelihood of accurate channel estimation. For example, locations and/or a number of resources allocated for DMRSs may affect accuracy of channel estimation and spectral efficiency (e.g., more resources allocated for DMRSs may improve accuracy of channel estimation at a cost of resources allocated for data).

Additionally, or alternatively, the base station may configure a transmission mode (e.g., a PUSCH transmission mode) for the UE with one or more parameters that may increase a signal gain for the message. For example, the base station may configure a transport block repetition mode, a DMRS bundling mode (e.g., where the UE may use one or more DMRSs from outside of a subframe to estimate a channel during a subframe), and/or frequency hopping, among other examples.

In some networks, a base station may provide a configuration of the DMRSs via radio resource control (RRC) signaling. However, the RRC signaling may not be associated with an activation time (e.g., a time measured from receipt of the RRC signaling until the configuration takes effect), which may cause the UE and the base station to be unsynchronized during a transition period. Additionally, RRC signaling may be nonsynchronous and may have a latency of several tens of milliseconds to reconfigure the UE based at least in part on the RRC signaling. For at least this reason, the base station may be unable to dynamically change a configuration of the DMRSs. Instead, some networks use fixed DMRS configurations. However, using a fixed DMRS configuration may limit network flexibility to select a DMRS configuration based at least in part on current network conditions, a current PUSCH transmission mode, and/or a current state of the UE, among other examples. This may consume network resources by using a configuration with an unnecessarily high number of DMRSs and/or consume computing, network, communication, and power resource to detect and correct errors caused by using a configuration with an insufficient number of DMRSs.

In some aspects described herein, a base station may determine a DMRS configuration and a PUSCH transmission mode for a UE. In some aspects, the base station may determine the DMRS configuration based at least in part on the PUSCH transmission mode, may determine the PUSCH transmission mode based at least in part on the DMRS configuration, and/or may determine the DMRS configuration and the PUSCH transmission mode jointly. The base station may transmit a dynamic joint indication of the DMRS configuration and the PUSCH transmission. In some aspects, the base station may transmit the dynamic joint indication using one or more medium access control (MAC) control elements (MAC CEs) and/or a DCI message.

In some aspects, the base station may transmit (e.g., using RRC signaling) an indication of a set of candidate joint configurations of DMRS configurations and PUSCH transmission modes. The base station may transmit (e.g., via one or more MAC CEs) an intermediate indication to identify a subset of the candidate joint configurations. In some aspects, the base station may transmit (e.g., via one or more MAC CEs and/or DCI) a dynamic joint configuration of the DMRS configuration and the PUSCH transmission mode based at least in part on the intermediate indication, or independently from (e.g., in the absence of) the intermediate indication.

In this way, the base station may flexibly indicate DMRS configurations and PUSCH transmission modes based at least in part on current network conditions and/or a current state of the UE, among other examples. Additionally, or alternatively, the base station may determine the DMRS configurations and PUSCH transmission modes in a coordinated way based at least in part on the current network conditions and/or a current state of the UE, among other examples. In this way, the UE and the base station may conserve computing, network, communication, and network resources that may otherwise be used by using a DMRS configuration with an unnecessarily high number of DMRSs and/or using a PUSCH transmission mode with configuration parameters to increase a signal gain unnecessarily (e.g., based at least in part on the DMRS configuration). Additionally, or alternatively, the UE and the base station may conserve computing, network, communication, and power resource that may otherwise be used to detect and correct errors caused by using a configuration with an insufficient number of DMRSs in a network that uses fixed DMRS configurations.

Figure 3:
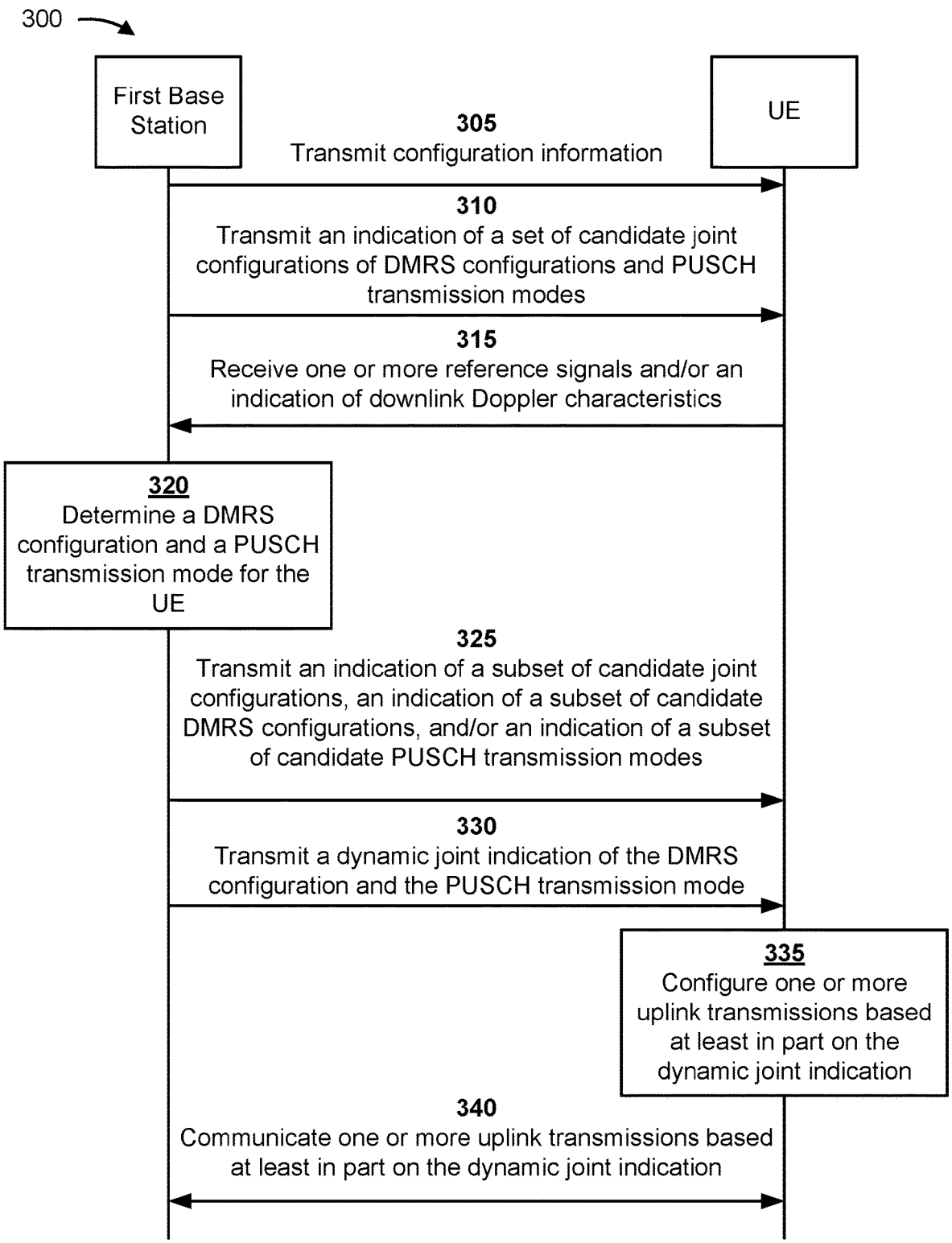

FIG. 3 is a diagram illustrating an example 300 associated with dynamic joint indications of a DMRS configuration and a physical uplink channel transmission mode, in accordance with various aspects of the present disclosure. As shown in FIG. 3, a UE (e.g., UE 120) may communicate with a base station (e.g., base station 110). In some aspects, the UE and the base station may be part of one or more wireless networks (e.g., wireless network 100).

As shown by reference number 305, the base station may transmit, and the UE may receive, configuration information. In some aspects, the UE may receive configuration information from another device (e.g., from another base station and/or another UE) and/or determine the configuration information from a communication standard (e.g., already known to the UE), among other examples. In some aspects, the UE may receive the configuration information via one or more of RRC signaling, one or more MAC CEs, and/or the like. In some aspects, the configuration information may include an indication of one or more configuration parameters (e.g., already known to the UE) for selection by an additional indication (e.g., downlink control information (DCI) and/or a medium access control (MAC) control element (CE), among other examples), explicit configuration information for the UE to use to configure the UE, and/or the like. In some aspects, the configuration information may indicate enabled and/or disabled communication features such that subsequent DCI and/or MAC CEs align with the enabled and/or disabled communication features.

In some aspects, the configuration information may indicate that the UE is to transmit one or more reference signals (e.g., sounding reference signals (SRS)) and/or an indication of one or more parameters of channel conditions (e.g., a Doppler spread and/or Doppler shift characteristics or equivalently channel time correlation characteristics). In some aspects, the configuration information may indicate that the UE is to apply a default DMRS configuration and/or a default PUSCH transmission mode (e.g., with one or more default PUSCH transmission mode parameters) until reception of a dynamic indication of a DMRS configuration and/or a dynamic indication of a PUSCH transmission mode (e.g., a joint indication). In some aspects, the configuration information may indicate that the UE is to receive a dynamic joint indication of a DMRS configuration and a PUSCH transmission mode. In some aspects, the configuration information may indicate that the UE is to apply the dynamic joint indication of a DMRS configuration and a PUSCH transmission mode to a configured number of transmissions, for a configured amount of time, and/or indefinitely until reception of an additional dynamic joint indication of a DMRS configuration and a PUSCH transmission mode, among other examples. In some aspects, the configuration information may indicate a number of candidate joint configurations that may be indicated (e.g., by one or more MAC CEs) in a subset of candidate joint configurations for selection by the dynamic joint indication (e.g., in a DCI message).

The UE may configure the UE based at least in part on the configuration information. In some aspects, the UE may be configured to perform one or more operations described herein.

As shown by reference number 310, the base station may transmit, and the UE may receive, an indication of a set of candidate joint configurations of DMRS configurations and PUSCH transmission modes. In some aspects, the base station may transmit the indication of the set of candidate joint configurations that includes a plurality of candidate joint configurations from which the base station may select one or more subsets. In some aspects, the base station may transmit an indication or configuration of a number of candidate joint configurations that are to be included in the subset of candidate joint configurations with, or in addition to, the indication of the set of candidate joint configurations.

As shown by reference number 315, the base station may receive, and the UE may transmit, one or more reference signals and/or an indication of downlink Doppler characteristics. For example, the indication of downlink Doppler characteristics may include Doppler spread and/or Doppler shift characteristics or, equivalently, channel time correlation characteristics. In some aspects, the base station may receive the one or more reference signals (e.g., SRSs) for use in determining channel conditions. In some aspects, the base station may determine a Doppler spread based at least in part on measurement of the one or more reference signals. In some aspects, the base station may determine a Doppler spread based at least in part on the indication of the downlink Doppler spread provided by the UE (e.g., based at least in part on an assumption of Doppler reciprocity).

As shown by reference number 320, the base station may determine a DMRS configuration and a PUSCH transmission mode for the UE. In some aspects, the base station may determine the DMRS configuration based at least in part on one or more spectral efficiency maximization criteria that are based at least in part on channel characteristics. For example, the base station may determine the DMRS configuration based at least in part on an average post processing signal-to-interference-plus-noise ratio (SINR) per data resource element per stream, a delay spread, Doppler characteristics, an input signal to noise ratio (SNR), and/or parameters of one or more candidate DMRS configurations (e.g., a time-domain density, a frequency-domain density, and/or an available power boost for DMRS resources), among other examples.

In some aspects, the base station may determine a PUSCH transmission mode to improve a link efficiency or reliability for uplink transmissions. In some aspects, the base station may determine the PUSCH transmission mode based at least in part on measurements of the one or more reference signals received from the UE. In some aspects, the PUSCH transmission mode may include indications of a transport block repetition parameter, a DMRS bundling parameter for joint channel estimation across multiple slots, and/or one or more frequency hopping parameters, among other examples.

In some aspects, the base station may determine the DMRS configuration based at least in part on the PUSCH transmission mode, the PUSCH transmission mode based at least in part on the applicable DMRS configuration, and/or the PUSCH transmission mode and the DMRS configuration jointly, among other examples. In some aspects, the base station may determine the DMRS configuration in conjunction with the PUSCH transmission mode (e.g., one or more parameters of the PUSCH transmission mode) based at least in part on an estimated/expected spectral efficiency of an uplink transmission that uses the DMRS configuration and the PUSCH transmission mode, based at least in part on one or more channel conditions.

As shown by reference number 325, the base station may transmit, and the UE may receive, an indication of a subset of candidate joint configurations of candidate DMRS configurations with candidate PUSCH transmission modes, an indication of a subset of candidate DMRS configurations, and/or an indication of a subset of candidate PUSCH transmission modes. In some aspects, the base station may transmit the indication of the subset of candidate joint configurations via one or more MAC CEs. In this way, the base station may dynamically transmit the indication of the subset of candidate joint configurations with a relatively low updating rate when compared with a dynamic joint indication of the DMRS configuration and the PUSCH transmission mode (e.g., via DCI).

In some aspects, the base station may transmit the indication of the subset of candidate joint configurations, from the set of candidate joint configurations previously indicated to the UE, that each indicate a candidate DMRS configuration and a candidate PUSCH transmission mode. In some aspects, each candidate joint configuration may be mapped to a code point that may be indicated in subsequent dynamic signaling (e.g., via DCI).

In some aspects, the base station may indicate a subset of candidate DMRS configurations from which subsequent signaling may indicate a selected candidate DMRS configuration along with an indication of a PUSCH transmission mode. In some aspects, the base station may indicate a subset of candidate PUSCH transmission modes from which subsequent signaling may indicate a selected candidate PUSCH transmission mode along with an indication of a DMRS configuration. In other words, the base station may provide a subset of candidate DMRS configurations for subsequent selection, a subset of candidate PUSCH transmission modes, or a subset of candidate joint configurations of DMRS configurations and PUSCH transmission modes.

As shown by reference number 330, the base station may transmit, and the UE may receive, a dynamic joint indication of the DMRS configuration and the PUSCH transmission mode. In some aspects, the base station may transmit the dynamic indication via DCI (e.g., a scheduling DCI) or via one or more MAC CEs. In some aspects, the indication of the selection of the candidate joint configuration may include a code point indication of a selection from a subset of candidate joint configurations or a set of candidate joint configurations. In some aspects, the dynamic joint indication may indicate a change from a default DMRS configuration and default PUSCH transmission mode. The default DMRS configuration may be based at least in part on an RRC configured default DMRS configuration and/or a communication protocol indication of the default DMRS configuration, among other examples.

In some aspects, the dynamic joint indication may indicate a selection from a subset of candidate DMRS configurations and/or a subset of candidate PUSCH transmission modes (e.g., jointly or separately), among other examples. In some aspects, the dynamic joint indication may indicate a selection from a set of candidate joint configurations (e.g., selected from the indicated set of candidate joint configurations). In some aspects, the dynamic joint indication may include an explicit indication of the DMRS configuration and the PUSCH transmission mode.

As shown by reference number 335, the UE may configure one or more uplink transmissions based at least in part on the dynamic joint indication. In some aspect, the UE may apply the indication of the candidate joint configuration to one or more subsequent uplink transmissions. In some aspects, the UE may apply the indication of the selection of the candidate joint configuration until reception of a subsequent indication of a subsequent selection of a subsequent candidate joint configuration.

In some aspects, the UE may configure the one or more uplink transmissions to use an indicated DMRS configuration and one or more parameters associated with the PUSCH transmission mode.

As shown by reference number 340, the base station and the UE may communicate one or more uplink transmissions based at least in part on the dynamic joint indication. In some aspects, the UE may use the indicated DMRS configuration and PUSCH transmission mode until reception of a subsequent indication to change the DMRS configuration and/or the PUSCH transmission mode, for a configured amount of time (e.g., and then revert to a default joint configuration), and/or for a configured number of uplink transmissions (e.g., and then revert to a default joint configuration).

Based at least in part on the base station transmitting the dynamic joint indication of the DMRS configuration and the PUSCH transmission mode, the base station may flexibly indicate DMRS configurations and PUSCH transmission modes based at least in part on current network conditions and/or a current state of the UE, among other examples.

Additionally, or alternatively, the base station may determine the DMRS configurations and PUSCH transmission modes in a coordinated way based at least in part on the current network conditions and/or a current state of the UE, among other examples. In this way, the UE and the base station may conserve computing, network, communication, and network resources that may otherwise be used by using a DMRS configuration with an unnecessarily high number of DMRSs and/or using a PUSCH transmission mode with configuration parameters not allowing to increase a link efficiency (e.g., based at least in part on the DMRS configuration). Additionally, or alternatively, the UE and the base station may conserve computing, network, communication, and power resource that may otherwise be used to detect and correct errors caused by using a configuration with an insufficient number of DMRSs in a network that uses fixed DMRS configurations.

As indicated above, FIG. 3 is provided as an example. Other examples may differ from what is described with regard to FIG. 3.

Figure 4:
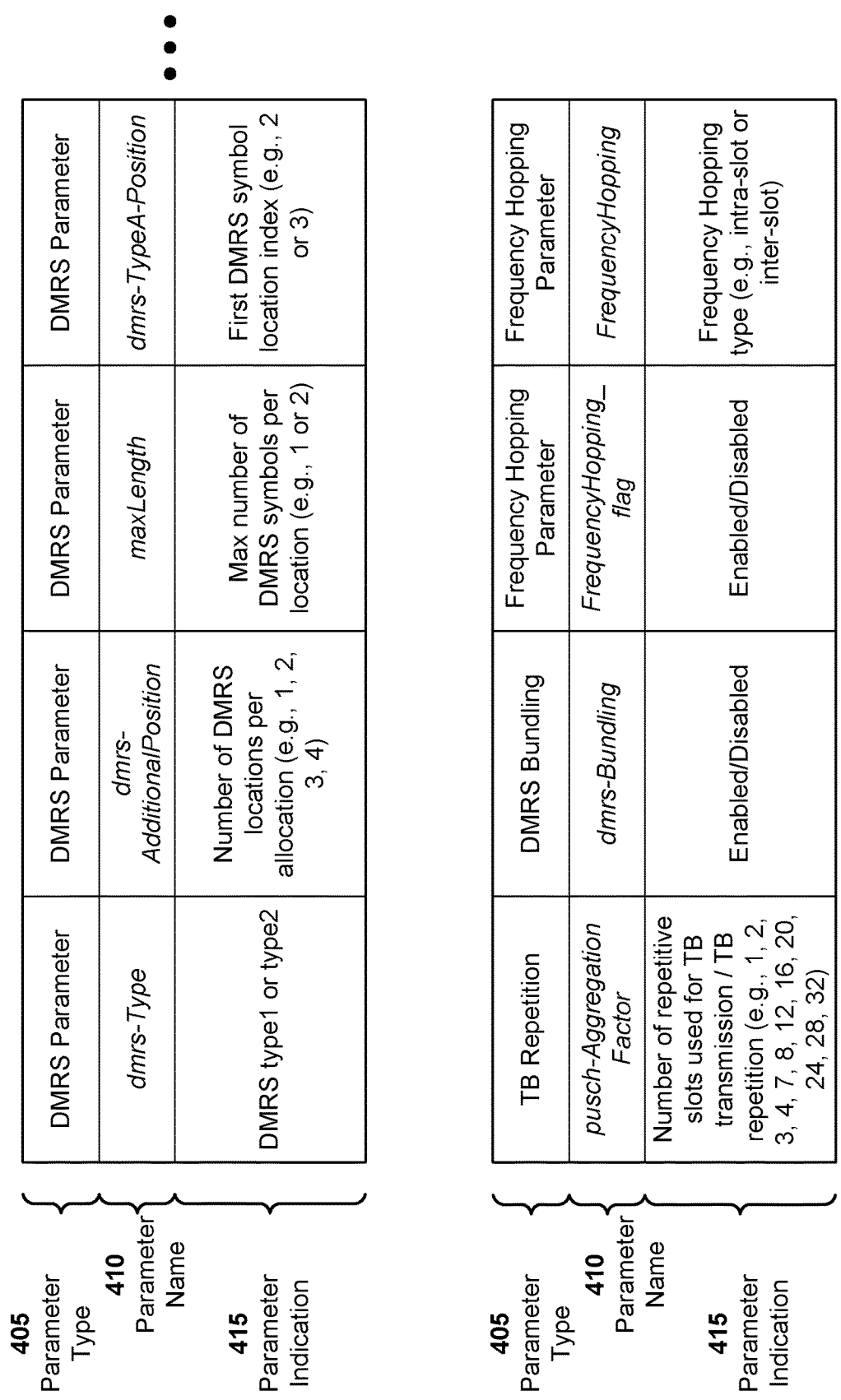

FIG. 4 is a diagram illustrating an example 400 associated with dynamic joint indications of a DMRS configuration and a PUSCH transmission mode, in accordance with the present disclosure. As shown in FIG. 4, a joint indication of a DMRS configuration and a PUSCH transmission mode may include a plurality of parameters. In some aspects, a base station (e.g., base station 110) may indicate the joint indication to a UE (e.g., UE 120).

As shown in FIG. 4, the joint indication may be associated with a plurality of parameter types 405. The plurality of types may be associated with a parameter name and a parameter indication (e.g., information that may be indicated by a parameter). As shown, the joint indication may include a plurality of DMRS parameters, (e.g., having parameter names 410) that may include a first parameter (e.g., dmrs-Type) that indicates a DMRS Type (e.g., type1 or type2), a second parameter (e.g., dmrs-AdditionalPosition) that indicates a number of DMRS locations per allocation (e.g., 1, 2, 3, or 4, among other examples), a third parameter (e.g., maxLength) that indicates a maximum number of DMRS symbols per location (e.g., 1 or 2 consecutive DMRS symbols), and/or a fourth parameter (e.g., dmrs-TypeA-Position) that indicates first DMRS symbol location index (e.g., 2, or 3), if Type A DMRS is selected. The parameters may be associated with parameter indications 415 that provide indications between the UE and the base station associated with the parameters.

As also shown in FIG. 4, the joint indication may include a plurality of PUSCH transmission mode parameters that may include a first parameter (e.g., pusch-Aggregation Factor) that indicates a number of repetitive slots used for transport block (TB) transmission and/or TB repetition (e.g., 1, 2, 3, 4, 7, 8, 12, 16, 20, 24, 28, 32), a second parameter (e.g., dmrs-Bundling) that indicates whether DMRS bundling is enabled, a third parameter (e.g., FrequencyHopping_flag) that indicates whether frequency hopping is enabled, and/or a fourth parameter (e.g., FrequencyHopping) that indicates whether an enable frequency hopping mode is for intra-slot or inter-slot frequency hopping.

As indicated above, FIG. 4 is provided as an example. Other examples may differ from what is described with regard to FIG. 4.

FIG. 5 is a diagram illustrating an example associated with dynamic joint indications of a DMRS configuration and a PUSCH transmission mode, in accordance with the present disclosure. As shown in FIG. 5, a joint indication of a DMRS configuration and a PUSCH transmission mode may be selected from a set of candidate joint indications and/or a subset of candidate joint configurations. In some aspects, a base station (e.g., base station 110) may indicate the joint indication to a UE (e.g., UE 120).

As shown in FIG. 5, a set 500 of candidate joint indications may include a plurality of candidate joint indications that are associated with multiple parameters of a DMRS configuration and a PUSCH transmission mode. The set 500 of candidate joint indications may include a set of all possible combinations of the parameters or a set of preferred combinations of the parameters. In some aspects, the base station may provide an indication of the set 500 of candidate joint indications via RRC signaling for subsequent selection via dynamic signaling (e.g., MAC layer signaling and/or DCI).

As shown in FIG. 5, a subset 510 of the candidate joint indications may include a proper subset of the set 500 of candidate joint indications with a plurality of candidate joint indications excluded from the set 500 of candidate joint indications, which may reduce an amount of network resources to be used to transmit an indication of the subset 510 of the candidate joint indications. In some aspects, the base station may configure a number of candidate joint indications in the subset 510 of the candidate joint indications. For example, the number of candidate joint indications in the subset 510 of the candidate joint indications may be based at least in part on a number of bits within a DCI message that are allocated for indicating a selection from the subset 510 of the candidate joint indications.

As shown in FIG. 5, a dynamic joint indication 520 of the DMRS configuration and the PUSCH transmission mode may be selected from the set 500 of candidate joint indications and/or from the subset 510 of the candidate joint indications. In other words, the base station may indicate the dynamic joint indication 520 of the DMRS configuration and the PUSCH transmission mode based at least in part on a multi-step communication that may include RRC signaling to indicate the set 500 of candidate joint indications, MAC CE signaling to indicate the subset 510 of the candidate joint indications, and/or dynamic signaling (e.g., MAC CE or DCI) to indicate the dynamic joint indication 520.

As indicated above, FIG. 5 is provided as an example. Other examples may differ from what is described with regard to FIG. 5.

FIG. 6 is a diagram illustrating an example process 600 performed, for example, by a base station, in accordance with the present disclosure. Example process 600 is an example where the base station (e.g., base station 110) performs operations associated with dynamic joint indications of a demodulation reference signal (DMRS) configuration and a physical uplink channel transmission mode.

As shown in FIG. 6, in some aspects, process 600 may include transmitting a dynamic joint indication of a DMRS configuration and a PUSCH transmission mode (block 610). For example, the base station (e.g., using communication manager 808 and/or transmission component 804, depicted in FIG. 8) may transmit a dynamic joint indication of a DMRS configuration and a PUSCH transmission mode, as described above.

As further shown in FIG. 6, in some aspects, process 600 may include receiving one or more uplink transmissions based at least in part on the dynamic joint indication of the DMRS configuration and the PUSCH transmission mode (block 620). For example, the base station (e.g., using communication manager 808 and/or reception component 802, depicted in FIG. 8) may receive one or more uplink transmissions based at least in part on the dynamic joint indication of the DMRS configuration and the PUSCH transmission mode, as described above.

Process 600 may include additional aspects, such as any single aspect or any combination of aspects described below and/or in connection with one or more other processes described elsewhere herein.

In a first aspect, the PUSCH transmission mode includes an indication of one or more of a transport block repetition parameter, or a frequency hopping parameter.

In a second aspect, alone or in combination with the first aspect, the DMRS configuration includes one or more of a DMRS bundling parameter, a DMRS type, a number of additional DMRS locations per allocation, a maximum number of DMRS symbols per location, a first DMRS symbol location index, a number of DMRS code division multiplexing groups without data, an indication of one or more DMRS ports, a number of front-loaded DMRS symbols, or locations (e.g., using corresponding OFDM symbol indexes) of DMRS symbols per allocation.

In a third aspect, alone or in combination with one or more of the first and second aspects, the DMRS configuration is based at least in part on the PUSCH transmission mode, wherein the PUSCH transmission mode is based at least in part on the DMRS configuration, or wherein the PUSCH transmission mode and the DMRS configuration are jointly dependent.

In a fourth aspect, alone or in combination with one or more of the first through third aspects, transmitting the dynamic joint indication of the DMRS configuration and the PUSCH transmission mode comprises transmitting an indication of a subset of candidate joint configurations that each indicate a candidate DMRS configuration and a candidate PUSCH transmission mode, and transmitting an indication of a selection of a candidate joint configuration of the subset of candidate joint configurations.

In a fifth aspect, alone or in combination with one or more of the first through fourth aspects, transmitting the indication of the subset of candidate joint configurations that each indicate a candidate DMRS configuration and a candidate PUSCH transmission mode comprises transmitting the indication of the subset of candidate joint configurations that each indicate a candidate DMRS configuration and a candidate PUSCH transmission mode via one or more medium access control control elements.

In a sixth aspect, alone or in combination with one or more of the first through fifth aspects, transmitting the indication of the selection of the candidate joint configuration of the subset of candidate joint configurations comprises transmitting the indication of the selection of the candidate joint configuration of the subset of candidate joint configurations via downlink control information.

In a seventh aspect, alone or in combination with one or more of the first through sixth aspects, the indication of the selection of the candidate joint configuration of the subset of candidate joint configurations via downlink control information includes a code point indication of the selection.

In an eighth aspect, alone or in combination with one or more of the first through seventh aspects, process 600 includes transmitting an indication of a set of candidate joint configurations that includes the subset of candidate joint configurations.

In a ninth aspect, alone or in combination with one or more of the first through eighth aspects, process 600 includes transmitting an indication of a subset of candidate DMRS configurations via one or more MAC CEs, wherein the dynamic joint indication of the DMRS configuration and the PUSCH transmission mode includes an indication of a selection of a candidate DMRS configuration and an indication of one or more parameters of the PUSCH transmission mode.

In a tenth aspect, alone or in combination with one or more of the first through ninth aspects, transmitting the dynamic joint indication of the DMRS configuration and the PUSCH transmission mode comprises transmitting an indication of a selection of a candidate joint configuration that indicates a candidate DMRS configuration and a candidate PUSCH transmission mode.

In an eleventh aspect, alone or in combination with one or more of the first through tenth aspects, transmitting the indication of the selection of the candidate joint configuration that indicates a candidate DMRS configuration and a candidate PUSCH transmission mode comprises transmitting the indication of the selection of the candidate joint configuration via one or more MAC CEs.

In a twelfth aspect, alone or in combination with one or more of the first through eleventh aspects, the indication of the selection of the candidate joint configuration applies to one or more subsequent uplink transmissions until transmission of a subsequent indication of a subsequent selection of a subsequent candidate joint configuration.

In a thirteenth aspect, alone or in combination with one or more of the first through twelfth aspects, the dynamic joint indication indicates a change from a default DMRS configuration and default PUSCH transmission mode.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a user equipment, in accordance with the present disclosure. Example process 700 is an example where the user equipment (e.g., UE 120) performs operations associated with dynamic joint indications of a DMRS configuration and a PUSCH transmission mode.

As shown in FIG. 7, in some aspects, process 700 may include receiving a dynamic joint indication of a DMRS configuration and a PUSCH transmission mode (block 710). For example, the UE (e.g., using communication manager 908 and/or reception component 902, depicted in FIG. 9) may receive a dynamic joint indication of a DMRS configuration and a PUSCH transmission mode, as described above.

As further shown in FIG. 7, in some aspects, process 700 may include transmitting one or more uplink transmissions based at least in part on the dynamic joint indication (block 720). For example, the user equipment (e.g., using communication manager 140 and/or transmission component 904, depicted in FIG. 9) may transmit one or more uplink transmissions based at least in part on the dynamic joint indication, as described above.

Process 700 may include additional aspects, such as any single aspect or any combination of aspects described below and/or in connection with one or more other processes described elsewhere herein.

In a first aspect, receiving the dynamic joint indication of the DMRS configuration and the PUSCH transmission mode comprises receiving an indication of a subset of candidate joint configurations that each indicate a candidate DMRS configuration and a candidate PUSCH transmission mode, and receiving an indication of a selection of a candidate joint configuration of the subset of candidate joint configurations.

In a second aspect, alone or in combination with the first aspect, receiving the indication of the subset of candidate joint configurations that each indicate a candidate DMRS configuration and a candidate PUSCH transmission mode comprises receiving the indication of the subset of candidate joint configurations that each indicate a candidate DMRS configuration and a candidate PUSCH transmission mode via one or more MAC CEs.

In a third aspect, alone or in combination with one or more of the first and second aspects, receiving the indication of the selection of the candidate joint configuration of the subset of candidate joint configurations comprises receiving the indication of the selection of the candidate joint configuration of the subset of candidate joint configurations via DCI.

In a fourth aspect, alone or in combination with one or more of the first through third aspects, the indication of the selection of the candidate joint configuration of the subset of candidate joint configurations via DCI includes a code point indication of the selection.

In a fifth aspect, alone or in combination with one or more of the first through fourth aspects, process 700 includes receiving an indication of a set of candidate joint configurations that includes the subset of candidate joint configurations.

In a sixth aspect, alone or in combination with one or more of the first through fifth aspects, process 700 includes receiving an indication of a number of candidate joint configurations that are to be included in the subset of candidate joint configurations.

In a seventh aspect, alone or in combination with one or more of the first through sixth aspects, process 700 includes receiving an indication of a subset of candidate DMRS configurations via one or more MAC CEs, wherein the dynamic joint indication of the DMRS configuration and the PUSCH transmission mode includes an indication of a selection of a candidate DMRS configuration and an indication of one or more parameters of the PUSCH transmission mode.

In an eighth aspect, alone or in combination with one or more of the first through seventh aspects, receiving the dynamic joint indication of the DMRS configuration and the PUSCH transmission mode comprises receiving an indication of a selection of a candidate joint configuration that indicates a candidate DMRS configuration and a candidate PUSCH transmission mode.

In a ninth aspect, alone or in combination with one or more of the first through eighth aspects, receiving the indication of the selection of the candidate joint configuration that indicates a candidate DMRS configuration and a candidate PUSCH transmission mode comprises receiving the indication of the selection of the candidate joint configuration via one or more MAC CEs.

In a tenth aspect, alone or in combination with one or more of the first through ninth aspects, the indication of the selection of the candidate joint configuration applies to one or more subsequent uplink transmissions until reception of a subsequent indication of a subsequent selection of a subsequent candidate joint configuration.

In an eleventh aspect, alone or in combination with one or more of the first through tenth aspects, the dynamic joint indication indicates a change from a default DMRS configuration and default PUSCH transmission mode.

In an eleventh aspect, alone or in combination with one or more of the first through tenth aspects, the PUSCH transmission mode includes an indication of one or more of a transport block repetition parameter, or a frequency hopping parameter.

In a twelfth aspect, alone or in combination with one or more of the first through eleventh aspects, the DMRS configuration includes one or more of a DMRS bundling parameter, a DMRS type, a number of additional DMRS locations per allocation, a maximum number of DMRS symbols per location, a first DMRS symbol location index, a number of DMRS code division multiplexing groups without data, an indication of one or more DMRS ports, a number of front-loaded DMRS symbols, or location indexes of DMRS symbols per allocation Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
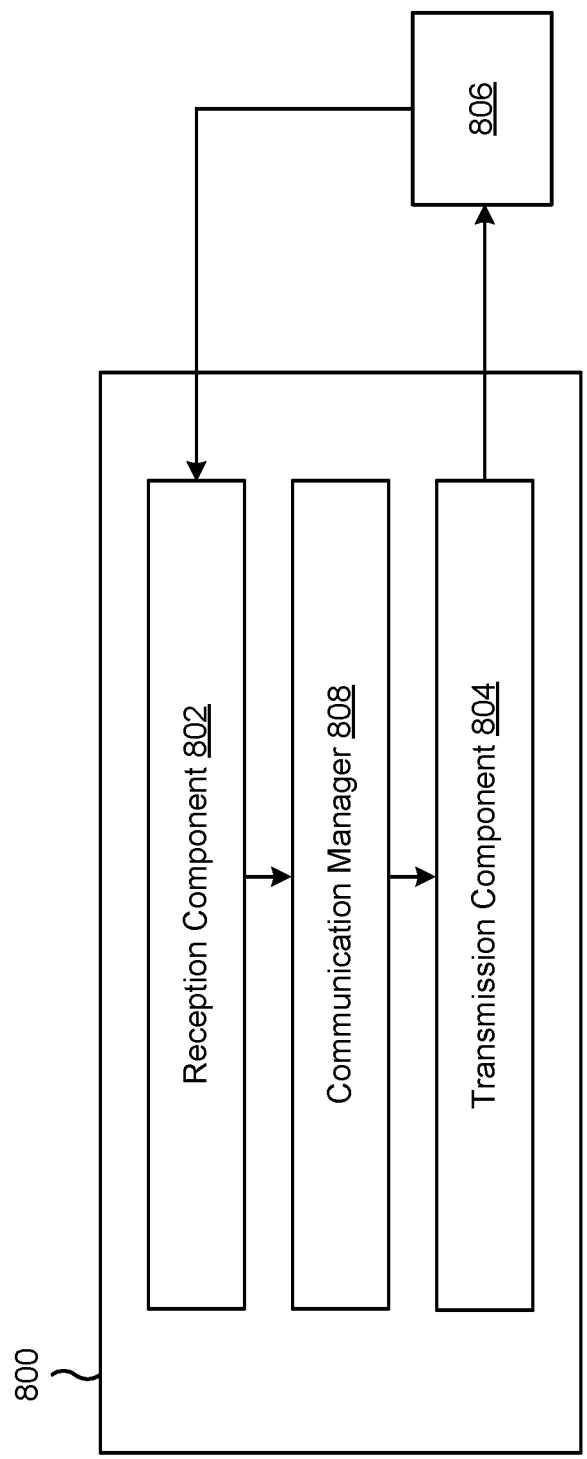
FIGS. 8 and 9 are block diagrams of example apparatuses for wireless communication, in accordance with the present disclosure.

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a dynamic joint indication of a DMRS configuration and a PUSCH transmission mode. The reception component 802 may receive one or more uplink transmissions based at least in part on the dynamic joint indication of the DMRS configuration and the PUSCH transmission mode.

The transmission component 804 may transmit an indication of a set of candidate joint configurations that includes the subset of candidate joint configurations.

The transmission component 804 may transmit an indication of a subset of candidate DMRS configurations via one or more MAC CEs, wherein the dynamic joint indication of the DMRS configuration and the PUSCH transmission mode includes an indication of a selection of a candidate DMRS configuration and an indication of one or more parameters of the PUSCH transmission mode.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
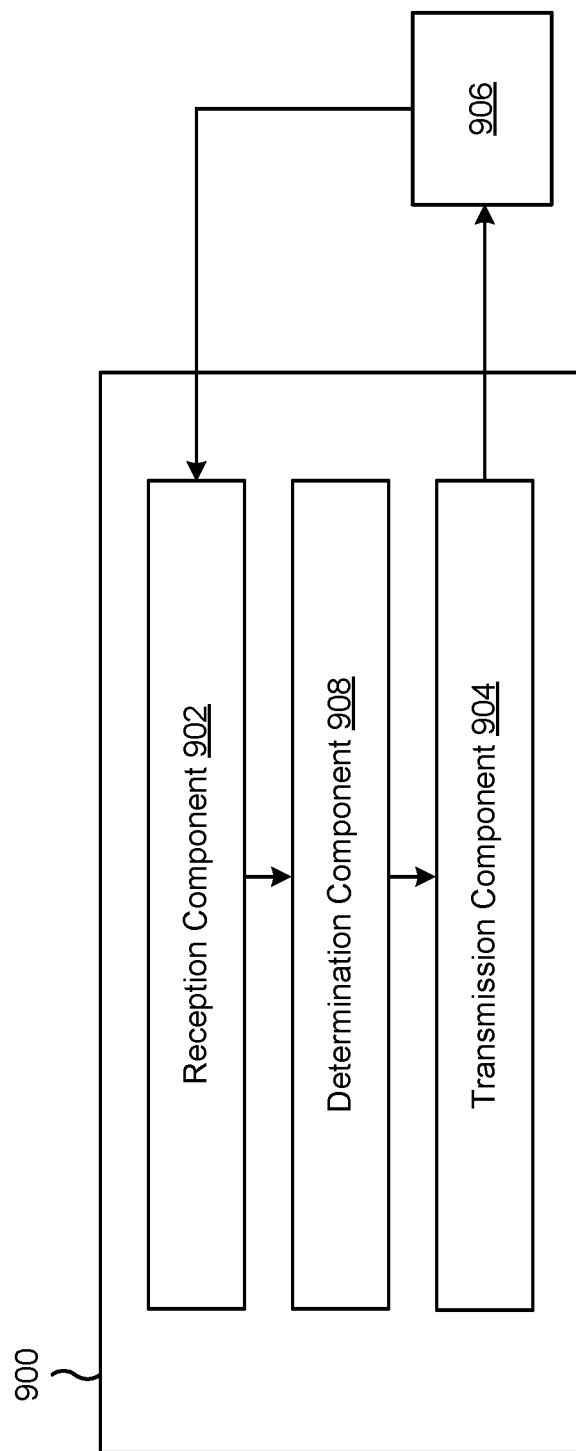

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a dynamic joint indication of a DMRS configuration and a PUSCH transmission mode. The transmission component 904 may transmit one or more uplink transmissions based at least in part on the dynamic joint indication.

The reception component 902 may receive an indication of a set of candidate joint configurations that includes the subset of candidate joint configurations.

The reception component 902 may receive an indication of a number of candidate joint configurations that are to be included in the subset of candidate joint configurations.

The reception component 902 may receive an indication of a subset of candidate DMRS configurations via one or more, wherein the dynamic joint indication of the DMRS configuration and the PUSCH transmission mode includes an indication of a selection of a candidate DMRS configuration and an indication of one or more parameters of the PUSCH transmission mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a base station, comprising: transmitting a dynamic joint indication of a demodulation reference signal (DMRS) configuration and a physical uplink shared channel (PUSCH) transmission mode; and receiving one or more uplink transmissions based at least in part on the dynamic joint indication of the DMRS configuration and the PUSCH transmission mode.

Aspect 2: The method of Aspect 1, wherein the PUSCH transmission mode includes an indication of one or more of: a transport block repetition parameter, or a frequency hopping parameter.

Aspect 3: The method of any of Aspects 1-2, wherein the DMRS configuration includes one or more of: a DMRS bundling parameter, a DMRS type, a number of additional DMRS locations per allocation, a maximum number of DMRS symbols per location, a first DMRS symbol location index, a number of DMRS code division multiplexing groups without data, an indication of one or more DMRS ports, a number of front-loaded DMRS symbols, or location indexes of DMRS symbols per allocation.

Aspect 4: The method of any of Aspects 1-3, wherein the DMRS configuration is based at least in part on the PUSCH transmission mode, wherein the PUSCH transmission mode is based at least in part on the DMRS configuration, or wherein the PUSCH transmission mode and the DMRS configuration are jointly dependent.

Aspect 5: The method of any of Aspects 1-4, wherein transmitting the dynamic joint indication of the DMRS configuration and the PUSCH transmission mode comprises: transmitting an indication of a subset of candidate joint configurations that each indicate a candidate DMRS configuration and a candidate PUSCH transmission mode, and transmitting an indication of a selection of a candidate joint configuration of the subset of candidate joint configurations.

Aspect 6: The method of Aspect 5, wherein transmitting the indication of the subset of candidate joint configurations that each indicate a candidate DMRS configuration and a candidate PUSCH transmission mode comprises: transmitting the indication of the subset of candidate joint configurations that each indicate a candidate DMRS configuration and a candidate PUSCH transmission mode via one or more medium access control control elements.

Aspect 7: The method of any of Aspects 5-6, wherein transmitting the indication of the selection of the candidate joint configuration of the subset of candidate joint configurations comprises: transmitting the indication of the selection of the candidate joint configuration of the subset of candidate joint configurations via downlink control information.

Aspect 8: The method of Aspect 7, wherein the indication of the selection of the candidate joint configuration of the subset of candidate joint configurations via downlink control information includes a code point indication of the selection.

Aspect 9: The method of any of Aspects 5-8, further comprising: transmitting an indication of a set of candidate joint configurations that includes the subset of candidate joint configurations.

Aspect 10: The method of any of Aspects 1-9, further comprising: transmitting an indication of a subset of candidate DMRS configurations via one or more medium access control control elements, wherein the dynamic joint indication of the DMRS configuration and the PUSCH transmission mode includes an indication of a selection of a candidate DMRS configuration and an indication of one or more parameters of the PUSCH transmission mode.

Aspect 11: The method of any of Aspects 1-10, wherein transmitting the dynamic joint indication of the DMRS configuration and the PUSCH transmission mode comprises: transmitting an indication of a selection of a candidate joint configuration that indicates a candidate DMRS configuration and a candidate PUSCH transmission mode.

Aspect 12: The method of Aspect 11, wherein transmitting the indication of the selection of the candidate joint configuration that indicates a candidate DMRS configuration and a candidate PUSCH transmission mode comprises: transmitting the indication of the selection of the candidate joint configuration via one or more medium access control control elements.

Aspect 13: The method of any of Aspects 11-12, wherein the indication of the selection of the candidate joint configuration applies to one or more subsequent uplink transmissions until transmission of a subsequent indication of a subsequent selection of a subsequent candidate joint configuration.

Aspect 14: The method of any of Aspects 1-13, wherein the dynamic joint indication indicates a change from a default DMRS configuration and default PUSCH transmission mode.

Aspect 15: A method of wireless communication performed by a user equipment, comprising: receiving a dynamic joint indication of a demodulation reference signal (DMRS) configuration and a physical uplink shared channel (PUSCH) transmission mode; and transmitting one or more uplink transmissions based at least in part on the dynamic joint indication.

Aspect 16: The method of Aspect 15, wherein receiving the dynamic joint indication of the DMRS configuration and the PUSCH transmission mode comprises: receiving an indication of a subset of candidate joint configurations that each indicate a candidate DMRS configuration and a candidate PUSCH transmission mode, and receiving an indication of a selection of a candidate joint configuration of the subset of candidate joint configurations.

Aspect 17: The method of Aspect 16, wherein receiving the indication of the subset of candidate joint configurations that each indicate a candidate DMRS configuration and a candidate PUSCH transmission mode comprises: receiving the indication of the subset of candidate joint configurations that each indicate a candidate DMRS configuration and a candidate PUSCH transmission mode via one or more medium access control control elements.

Aspect 18: The method of any of Aspects 16-17, wherein receiving the indication of the selection of the candidate joint configuration of the subset of candidate joint configurations comprises: receiving the indication of the selection of the candidate joint configuration of the subset of candidate joint configurations via downlink control information.

Aspect 19: The method of Aspect 18, wherein the indication of the selection of the candidate joint configuration of the subset of candidate joint configurations via downlink control information includes a code point indication of the selection.

Aspect 20: The method of any of Aspects 16-19, further comprising: receiving an indication of a set of candidate joint configurations that includes the subset of candidate joint configurations.

Aspect 21: The method of any of Aspects 15-20, further comprising: receiving an indication of a subset of candidate DMRS configurations via one or more medium access control control elements, wherein the dynamic joint indication of the DMRS configuration and the PUSCH transmission mode includes an indication of a selection of a candidate DMRS configuration and an indication of one or more parameters of the PUSCH transmission mode.

Aspect 22: The method of any of Aspects 16-21, wherein receiving the dynamic joint indication of the DMRS configuration and the PUSCH transmission mode comprises: receiving an indication of a selection of a candidate joint configuration that indicates a candidate DMRS configuration and a candidate PUSCH transmission mode.

Aspect 23: The method of Aspect 22, wherein receiving the indication of the selection of the candidate joint configuration that indicates a candidate DMRS configuration and a candidate PUSCH transmission mode comprises: receiving the indication of the selection of the candidate joint configuration via one or more medium access control control elements.

Aspect 24: The method of Aspect 23, wherein the indication of the selection of the candidate joint configuration applies to one or more subsequent uplink transmissions until reception of a subsequent indication of a subsequent selection of a subsequent candidate joint configuration.

Aspect 25: The method of any of Aspects 16-24, wherein the dynamic joint indication indicates a change from a default DMRS configuration and default PUSCH transmission mode.

Aspect 26: The method of any of Aspects 16-25, wherein the PUSCH transmission mode includes an indication of one or more of: a transport block repetition parameter, or a frequency hopping parameter.

Aspect 27: The method of any of Aspects 16-26, wherein the DMRS configuration includes one or more of: a DMRS bundling parameter, a DMRS type, a number of additional DMRS locations per allocation, a maximum number of DMRS symbols per location, a first DMRS symbol location index, a number of DMRS code division multiplexing groups without data, an indication of one or more DMRS ports, a number of front-loaded DMRS symbols, or location indexes of DMRS symbols per allocation Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a base station, comprising:
    a memory; and
    one or more processors, coupled to the memory, configured to:
        transmit a dynamic joint indication of a demodulation reference signal (DMRS) configuration and a physical uplink shared channel (PUSCH) transmission mode including an indication of one or more of a transport block repetition parameter, or a frequency hopping parameter; and
        receive one or more uplink transmissions based at least in part on the dynamic joint indication of the DMRS configuration and the PUSCH transmission mode.

2. The apparatus of claim 1, wherein the DMRS configuration includes one or more of:
    a DMRS bundling parameter,
    a DMRS type,
    a number of additional DMRS locations per allocation,
    a maximum number of DMRS symbols per location,
    a first DMRS symbol location index,
    a number of DMRS code division multiplexing groups without data,
    an indication of one or more DMRS ports,
    a number of front-loaded DMRS symbols, or
    location indexes of DMRS symbols per allocation.

3. The apparatus of claim 1, wherein the DMRS configuration is based at least in part on the PUSCH transmission mode,
    wherein the PUSCH transmission mode is based at least in part on the DMRS configuration, or
    wherein the PUSCH transmission mode and the DMRS configuration are jointly dependent.

4. The apparatus of claim 1, wherein the one or more processors, to transmit the dynamic joint indication of the DMRS configuration and the PUSCH transmission mode, are configured to:
    transmit an indication of a subset of candidate joint configurations that each indicate a candidate DMRS configuration and a candidate PUSCH transmission mode, and
    transmit an indication of a selection of a candidate joint configuration of the subset of candidate joint configurations.

5. The apparatus of claim 4, wherein the one or more processors, to transmit the indication of the subset of candidate joint configurations that each indicate a candidate DMRS configuration and a candidate PUSCH transmission mode, are configured to:
    transmit the indication of the subset of candidate joint configurations that each indicate a candidate DMRS configuration and a candidate PUSCH transmission mode via one or more medium access control control elements.

6. The apparatus of claim 4, wherein the one or more processors, to transmit the indication of the selection of the candidate joint configuration of the subset of candidate joint configurations, are configured to:
 transmit the indication of the selection of the candidate joint configuration of the subset of candidate joint configurations via downlink control information.

7. The apparatus of claim 6, wherein the indication of the selection of the candidate joint configuration of the subset of candidate joint configurations via downlink control information includes a code point indication of the selection.

8. The apparatus of claim 4, wherein the one or more processors are further configured to:
 transmit an indication of a set of candidate joint configurations that includes the subset of candidate joint configurations.

9. The apparatus of claim 1, wherein the one or more processors are further configured to:
 transmit an indication of a subset of candidate DMRS configurations via one or more medium access control control elements,
 wherein the dynamic joint indication of the DMRS configuration and the PUSCH transmission mode includes an indication of a selection of a candidate DMRS configuration and an indication of one or more parameters of the PUSCH transmission mode.

10. The apparatus of claim 1, wherein the one or more processors, to transmit the dynamic joint indication of the DMRS configuration and the PUSCH transmission mode, are configured to:
 transmit an indication of a selection of a candidate joint configuration that indicates a candidate DMRS configuration and a candidate PUSCH transmission mode.

11. The apparatus of claim 10, wherein the one or more processors, to transmit the indication of the selection of the candidate joint configuration that indicates a candidate DMRS configuration and a candidate PUSCH transmission mode, are configured to:
 transmit the indication of the selection of the candidate joint configuration via one or more medium access control control elements.

12. The apparatus of claim 10, wherein the indication of the selection of the candidate joint configuration applies to one or more subsequent uplink transmissions until transmission of a subsequent indication of a subsequent selection of a subsequent candidate joint configuration.

13. The apparatus of claim 1, wherein the dynamic joint indication indicates a change from a default DMRS configuration and default PUSCH transmission mode.

14. An apparatus for wireless communication at a user equipment (UE), comprising:
 a memory; and
 one or more processors, coupled to the memory, configured to:
  receive a dynamic joint indication of a demodulation reference signal (DMRS) configuration and a physical uplink shared channel (PUSCH) transmission mode including an indication of one or more of a transport block repetition parameter, or a frequency hopping parameter; and
  transmit one or more uplink transmissions based at least in part on the dynamic joint indication.

15. The apparatus of claim 14, wherein the one or more processors, to receive the dynamic joint indication of the DMRS configuration and the PUSCH transmission mode, are configured to:
 receive an indication of a subset of candidate joint configurations that each indicate a candidate DMRS configuration and a candidate PUSCH transmission mode, and
 receive an indication of a selection of a candidate joint configuration of the subset of candidate joint configurations.

16. The apparatus of claim 15, wherein the one or more processors, to receive the indication of the subset of candidate joint configurations that each indicate a candidate DMRS configuration and a candidate PUSCH transmission mode, are configured to:
 receive the indication of the subset of candidate joint configurations that each indicate a candidate DMRS configuration and a candidate PUSCH transmission mode via one or more medium access control control elements.

17. The apparatus of claim 15, wherein the one or more processors, to receive the indication of the selection of the candidate joint configuration of the subset of candidate joint configurations, are configured to:
 receive the indication of the selection of the candidate joint configuration of the subset of candidate joint configurations via downlink control information.

18. The apparatus of claim 17, wherein the indication of the selection of the candidate joint configuration of the subset of candidate joint configurations via downlink control information includes a code point indication of the selection.

19. The apparatus of claim 15, wherein the one or more processors are further configured to:
 receive an indication of a set of candidate joint configurations that includes the subset of candidate joint configurations.

20. The apparatus of claim 14, wherein the one or more processors are further configured to:
 receive an indication of a subset of candidate DMRS configurations via one or more medium access control control elements,
 wherein the dynamic joint indication of the DMRS configuration and the PUSCH transmission mode includes an indication of a selection of a candidate DMRS configuration and an indication of one or more parameters of the PUSCH transmission mode.

21. The apparatus of claim 14, wherein the one or more processors, to receive the dynamic joint indication of the DMRS configuration and the PUSCH transmission mode, are configured to:
 receive an indication of a selection of a candidate joint configuration that indicates a candidate DMRS configuration and a candidate PUSCH transmission mode.

22. The apparatus of claim 21, wherein the one or more processors, to receive the indication of the selection of the candidate joint configuration that indicates a candidate DMRS configuration and a candidate PUSCH transmission mode, are configured to:
 receive the indication of the selection of the candidate joint configuration via one or more medium access control control elements.

23. The apparatus of claim 22, wherein the indication of the selection of the candidate joint configuration applies to one or more subsequent uplink transmissions until reception of a subsequent indication of a subsequent selection of a subsequent candidate joint configuration.

24. The apparatus of claim 14, wherein the dynamic joint indication indicates a change from a default DMRS configuration and default PUSCH transmission mode.

25. The apparatus of claim 14, wherein the DMRS configuration includes one or more of:
   a DMRS bundling parameter,
   a DMRS type,
   a number of additional DMRS locations per allocation,
   a maximum number of DMRS symbols per location,
   a first DMRS symbol location index,
   a number of DMRS code division multiplexing groups without data,
   an indication of one or more DMRS ports,
   a number of front-loaded DMRS symbols, or
   location indexes of DMRS symbols per allocation.

26. A method of wireless communication performed by a base station, comprising:
   transmitting a dynamic joint indication of a demodulation reference signal (DMRS) configuration and a physical uplink shared channel (PUSCH) transmission mode including an indication of one or more of a transport block repetition parameter, or a frequency hopping parameter; and
   receiving one or more uplink transmissions based at least in part on the dynamic joint indication of the DMRS configuration and the PUSCH transmission mode.

27. The method of claim 26, wherein transmitting the dynamic joint indication of the DMRS configuration and the PUSCH transmission mode comprises:
   transmitting an indication of a subset of candidate joint configurations that each indicate a candidate DMRS configuration and a candidate PUSCH transmission mode, and
   transmitting an indication of a selection of a candidate joint configuration of the subset of candidate joint configurations.

28. A method of wireless communication performed by a user equipment, comprising:
   receiving a dynamic joint indication of a demodulation reference signal (DMRS) configuration and a physical uplink shared channel (PUSCH) transmission mode including an indication of one or more of a transport block repetition parameter, or a frequency hopping parameter; and
   transmitting one or more uplink transmissions based at least in part on the dynamic joint indication.

\* \* \* \* \*